(12) United States Patent
Morioka et al.

(10) Patent No.: US 12,327,851 B2
(45) Date of Patent: Jun. 10, 2025

(54) BATTERY UNIT

(71) Applicants: TOYOTA JIDOSHA KABUSHIKI KAISHA, Toyota Aichi-ken (JP); KABUSHIKI KAISHA TOYOTA JIDOSHOKKI, Kariya Aichi-ken (JP)

(72) Inventors: Satoshi Morioka, Okazaki Aichi-ken (JP); Shigeru Fukuda, Nagoya Aichi-ken (JP); Hiromi Ueda, Kariya Aichi-ken (JP)

(73) Assignees: TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 599 days.

(21) Appl. No.: 17/700,738

(22) Filed: Mar. 22, 2022

(65) Prior Publication Data
US 2022/0384879 A1 Dec. 1, 2022

(30) Foreign Application Priority Data
May 25, 2021 (JP) .................................. 2021-087825

(51) Int. Cl.
*H01M 10/6554* (2014.01)
*H01M 10/48* (2006.01)
*H01M 10/613* (2014.01)

(52) U.S. Cl.
CPC ..... *H01M 10/6554* (2015.04); *H01M 10/486* (2013.01); *H01M 10/613* (2015.04)

(58) Field of Classification Search
CPC ........... H01M 10/6554; H01M 10/486; H01M 10/613; H01M 10/48; H01M 10/0585;
(Continued)

(56) References Cited

U.S. PATENT DOCUMENTS

2016/0079638 A1* 3/2016 Chu .................... H01M 10/637
429/62
2019/0348648 A1* 11/2019 Hase ................... H01M 10/482
(Continued)

FOREIGN PATENT DOCUMENTS

JP 2015-053261 A 3/2015
JP 2021068668 A * 4/2021 ............ H01M 50/20

OTHER PUBLICATIONS

Machine Translation of KR20200049123A Description (Year: 2024).*
English machine translation of JP2021068668A.*

*Primary Examiner* — Matthew T Martin
*Assistant Examiner* — Felicity B Alban
(74) *Attorney, Agent, or Firm* — Dinsmore & Shohl LLP

(57) ABSTRACT

A battery unit includes a battery module having electrode sheets stacked along a first direction, and a cooling plate superposed on a surface of the battery module. Each electrode sheet has a coated portion having a surface on which an active substance exists, and an uncoated portion that is located adjacent to the coated portion, and has both surfaces on which the active substance does not exist. The cooling plate has a main plate opposed to the coated portion, and a sensor holder attached to an outer edge of the main plate. A boundary between the coated portion and uncoated portion of the electrode sheet and a boundary between the main plate and the sensor holder on an abutting surface of the cooling plate do not overlap with each other, when viewed along the first direction, in a section in which the boundaries extend in parallel with each other.

14 Claims, 3 Drawing Sheets

(58) Field of Classification Search
CPC ........... H01M 10/0525; H01M 10/655; H01M 10/6557; H01M 10/6561; Y02E 60/10
See application file for complete search history.

(56) References Cited

U.S. PATENT DOCUMENTS

2021/0184292 A1* 6/2021 Park ..................... H01M 50/20
2022/0158269 A1* 5/2022 Pettersson ......... H01M 10/6568

* cited by examiner

BATTERY UNIT

CROSS-REFERENCE TO RELATED APPLICATION

This application claims priority to Japanese Patent Application No. 2021-087825 filed on May 25, 2021, incorporated herein by reference in its entirety.

BACKGROUND

1. Technical Field

The technology disclosed in the specification relates to a battery unit including a battery module having a plurality of electrode sheets stacked together, and a cooling plate superposed on a surface of the battery module.

2. Description of Related Art

An example of the battery unit (e.g., all-solid-state battery) constructed as described above is disclosed in Japanese Unexamined Patent Application Publication No. 2015-53261 (JP 2015-53261 A). An active substance exists on a part of at least one surface of the electrode sheet (e.g., an aluminum laminate film) of the battery module.

SUMMARY

In the battery module having the electrode sheets stacked together, a portion of the electrode sheet on which the active substance exists is less likely to deform than a portion of the electrode sheet on which no active substance exists. Therefore, stress is likely to concentrate at a boundary between these portions. Also, the cooling plate is in abutting contact with a surface of the battery module. In the cooling plate, a sensor holder that holds a sensor that detects information concerning the battery module may be attached to an outer edge of a main plate that cools the battery module. In this case, a boundary between the main plate and the sensor holder is formed on a surface of the cooling plate that is in abutting contact with the surface of the battery module. A step may appear on the boundary, due to a manufacturing error, etc., for example. When the step formed at the boundary between the main plate and the sensor holder comes into abutting contact with the surface of the battery module, the electrode sheet at the surface is particularly likely to be damaged, at a boundary between the portion of the battery module where the active substance exists and stress is likely to be generated, and the portion where no active substance exists. In the specification, the technology that can reduce damage to the electrode sheets, in the battery unit constructed as described above, is provided.

A battery unit disclosed in the specification includes a battery module having a plurality of electrode sheets stacked along a first direction, and a cooling plate that is superposed on a surface of the battery module. Each of the electrode sheets has a coated portion having at least one surface on which an active substance exists, and an uncoated portion that is located adjacent to the coated portion, and has both surfaces on which the active substance does not exist. The cooling plate has a main plate that is opposed to the coated portion, and is configured to cool the battery module, and at least one sensor holder that is attached to an outer edge of the main plate, and is configured to hold a sensor that detects information concerning the battery module. An abutting surface of the cooling plate that is in abutting contact with the battery module includes a boundary between the main plate and the sensor holder. In the battery unit disclosed in the specification, a boundary between the coated portion and the uncoated portion of the electrode sheet and the boundary between the main plate and the sensor holder on the abutting surface of the cooling plate do not overlap with each other, when viewed along the first direction, in a section in which the boundary between the coated portion and the uncoated portion and the boundary between the main plate and the sensor holder extend in parallel with each other.

In the battery unit as described above, the boundary between the coated portion and the uncoated portion, at which stress is likely to be generated, does not overlap with the boundary between the main plate and the sensor holder, at which a step is likely to appear, in a section in which the boundaries extend in parallel with each other. In the other words, the boundary between the coated portion and the uncoated portion and the boundary between the main plate and the sensor holder are out of alignment, in a section in which the boundaries extend in parallel with each other. As a result, even when a step appears at the boundary between the main plate and the sensor holder, the step is less likely or unlikely to come into abutting contact with the boundary between the coated portion and the uncoated portion. Thus, the stress applied to the battery unit is distributed to a stress generated when a corner of the step contacts with the surface of the battery module, and a stress generated at the boundary between the coated portion and the uncoated portion. As a result, the battery unit disclosed in the specification can reduce damage to the electrode sheets.

Details of the technology disclosed in the specification and further improvements will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
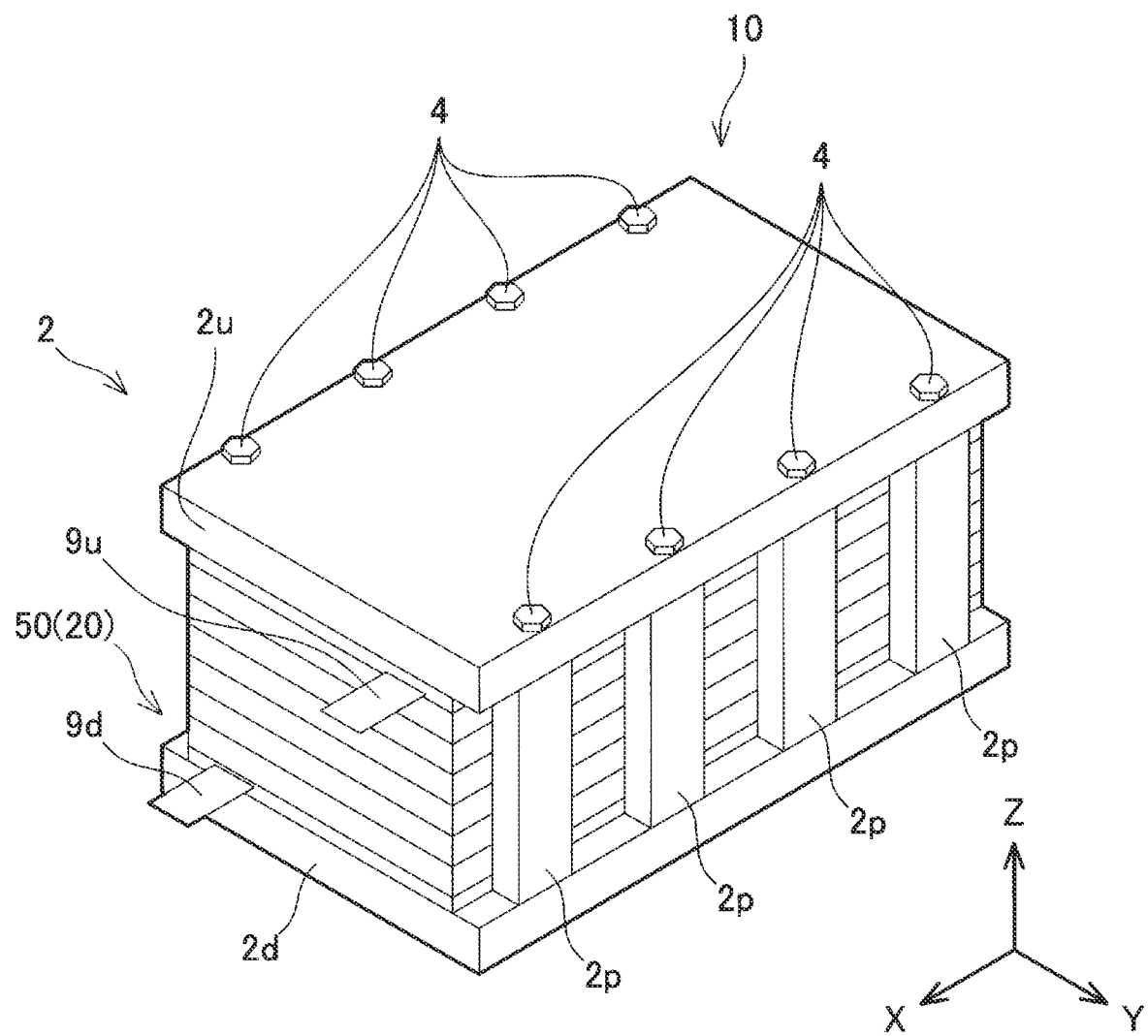
FIG. 1 is a perspective view of a battery unit of one embodiment.

In one form of the technology, at least a part of the boundary between the main plate and the sensor holder on the abutting surface may be located on the coated portion of the electrode sheet, when viewed along the first direction. With this arrangement, the sensor holder overlaps the coated portion. As a result, a sensor held by the sensor holder is located close to the coated portion, and the detection accuracy of the sensor can be improved.

In one form of the technology, the sensor holder may have a first sensor holder attached to a first outer edge of the main plate, and a second sensor holder attached to a second outer edge of the main plate located opposite to the first outer edge. With this arrangement, two or more sensors can be held on both sides of the main plate. As a result, the freedom in placement of the sensors can be improved.

In one form of the technology, the first sensor holder may hold a first sensor that detects a first type of information concerning the battery module, and the second sensor holder may hold a second sensor that detects a second type of information concerning the battery module which is different from the first type of information. With this arrangement, two or more types of information concerning the battery module can be detected.

In one form of the technology, the first sensor may be a temperature sensor that detects the temperature of the battery module. With this arrangement, information concerning the temperature of the battery module can be detected by the temperature sensor.

In one form of the technology, the second sensor may be a voltage sensor that detects a voltage of the battery module. With this arrangement, information concerning the voltage of the battery module can be detected by the voltage sensor.

In one form of the technology, the main plate may be made of metal, and the sensor holder may be made of resin. In this case, the sensor holder made of resin is more likely to deform, as compared with a cooling portion of the main plate made of metal. As a result, the uncoated portion that is opposed to the sensor holder made of resin is further likely to deform. Therefore, the technology disclosed in the specification becomes further useful.

In one form of the technology, the battery unit may include a plurality of battery modules and a plurality of cooling plates, and the battery modules and the cooling plates may be alternately arranged along the first direction. The uncoated portions of the electrode sheets stacked together are more likely to deform, as compared with the uncoated portion of a single layer. Thus, the technology disclosed in the specification becomes further useful.

In one form of the technology, at least one of the cooling plates has the main plate, and a spacer that has the same shape as the sensor holder and is attached to an outer edge of the main plate. With this arrangement, the cooling plate can have the spacer, in place of the sensor holder. Thus, the number of sensors can be reduced, as compared with the arrangement in which all of the cooling plates have the sensor holders.

In one form of the technology, the battery unit may further include a pressing unit configured to press the battery module and the cooling plate in the first direction. When the battery module and the cooling plate are pressed by the pressing unit, stress applied to the electrode sheet at a surface of the battery module is increased. Therefore, the technology disclosed in the specification becomes further useful.

Embodiment

A battery unit of one embodiment will be described with reference to the drawings. Initially, referring to FIG. 1 and FIG. 2, the configuration of the battery unit 10 of the embodiment will be described. The battery unit 10 is a lithium-ion secondary battery, for example. The battery unit 10 includes a battery module group 50 and a pressing unit 2. The battery module group 50 is constructed by stacking a plurality of flat battery modules 20 in the thickness direction thereof. A first terminal $9u$ and a second terminal $9d$ are provided on the positive side of the battery module group 50 as viewed in the X-axis direction (namely, on the left-hand side on the paper of FIG. 1). Each of the terminals $9u$, $9d$ is electrically connected to a peripheral device (not shown) of the battery unit 10. Thus, the battery unit 10 supplies electric power to the peripheral device, or stores electricity supplied from the peripheral device. In the following description, the direction in which the battery modules 20 are stacked together (namely, the Z-axis direction as one of the coordinate axes in the figures) may be called "first direction".

Figure 2:
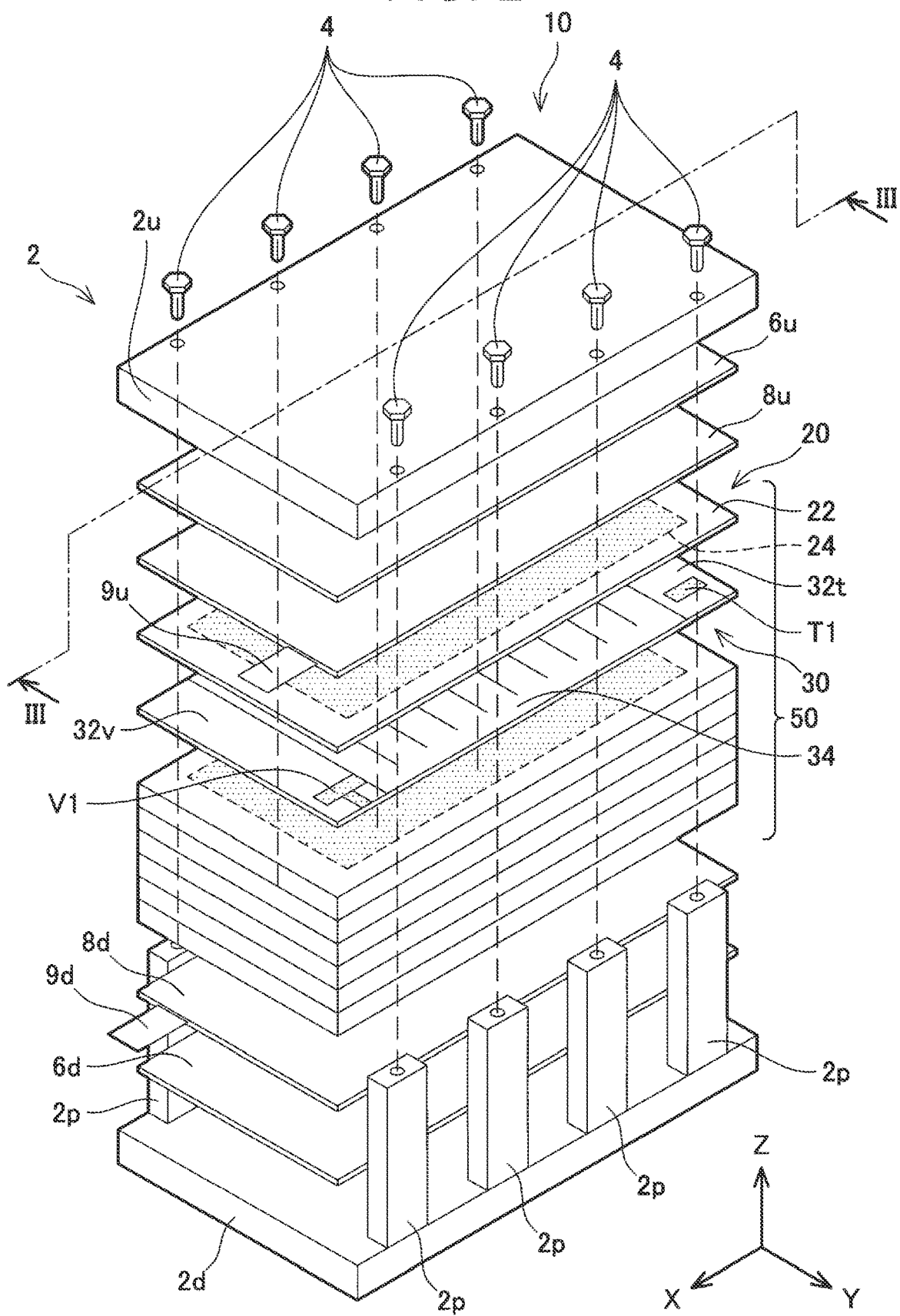
FIG. 2 is an exploded view of the battery unit of the embodiment.

The pressing unit 2 is a device for holding the battery module group 50. The pressing unit 2 includes a first pressing plate $2u$, a second pressing plate $2d$, and eight bolts 4. The second pressing plate $2d$ is provided with eight poles $2p$ that extend toward the first pressing plate $2u$. As shown in FIG. 2, each of the bolts 4 passes through a corresponding through-hole of the first pressing plate $2u$, and is screwed into a threaded hole provided in a corresponding one of the poles $2p$. In this manner, the pressing unit 2 holds the battery module group 50 in the inside thereof, while pressing the battery module group 50 in the first direction.

As shown in FIG. 2, the battery module group 50 consists of a plurality of battery modules 20 and a plurality of cooling plates 30, which are alternately laminated in the first direction. The battery module 20 has a flat shape extending in the X-axis direction. The battery module 20 includes a coated portion 24 and an uncoated portion 22. The coated portion 24 has a rectangular shape extending in the X-axis direction, and is located in a middle portion of the battery module 20. The structure of the battery module 20 will be described in detail later, referring to FIG. 3 and FIG. 4. The coated portion 24 is a range that is coated with an active substance 44 (see FIG. 4). The uncoated portion 22 is located around the coated portion 24. The uncoated portion 22 is a range that is not coated with the active substance. Each of the battery modules 20 has substantially the same structure.

The cooling plate 30 also has a flat shape extending in the X-axis direction, like the battery module 20. The cooling plate 30 includes a main plate 34, a first sensor holder $32t$, and a second sensor holder $32v$. The main plate 34 is made of metal, and channels 36 (see FIG. 4) are formed inside the main plate 34. The main plate 34 cools the battery module 20, by circulating a coolant (e.g., air) through the inside channels. Each of the cooling plates 30 has substantially the same structure.

The first sensor holder $32t$ is a plate made of resin and attached to an outer edge of the main plate 34 on the negative side in the X-axis direction (namely, on the right-hand side on the paper of FIG. 2). A temperature sensor T1 is fixed to the first sensor holder $32t$. The temperature sensor T1 is exposed to a surface of the first sensor holder $32t$ (i.e., a surface on the upper side of the paper of FIG. 2). The temperature sensor T1 detects the temperature of the battery module 20 placed on the surface of the first sensor holder $32t$. Also, the temperature sensor T1 is embedded in a recess formed in the surface of the first sensor holder $32t$. As a result, the temperature sensor T1 does not protrude from the surface of the first sensor holder $32t$; therefore, even if two or more cooling plates 30 are stacked in the first direction, the length of the battery module group 50 as measured in the first direction can be kept short.

The second sensor holder $32v$ is located on one side of the main plate 34 opposite to the first sensor holder $32t$. The second sensor holder $32v$ is a plate made of resin and attached to an outer edge of the main plate 34 on the positive side in the X-axis direction (namely, on the left-hand side on the paper of FIG. 2). A voltage sensor V1 is fixed to the second sensor holder $32v$. An outer edge of the voltage sensor V1 on the main plate 34 side is in abutting contact with the main plate 34. As described above, the main plate 34 is made of metal, and therefore, has electric conductivity. The voltage sensor V1 detects the voltage of the battery module 20, via the main plate 34.

A first current-collecting plate 8u and a first insulating plate 6u are placed between the battery module group 50 and the first pressing plate 2u. Similarly, a second current-collecting plate 8d and a second insulating plate 6d are placed between the battery module group 50 and the second pressing plate 2d. The first terminal 9u is connected to the first current-collecting plate 8u. The second terminal 9d is connected to the second current-collecting plate 8d. Each of the current-collecting plates 8u, 8d collects electricity generated by the battery module group 50, and generates the electricity to the peripheral device of the battery unit 10, via a corresponding one of the terminals 9u, 9d. Each of the insulating plates 6u, 6d prevents occurrence of short-circuiting between the battery module group 50 and each of the current-collecting plates 8u, 8d, and devices surrounding these components, etc.

Figure 3:
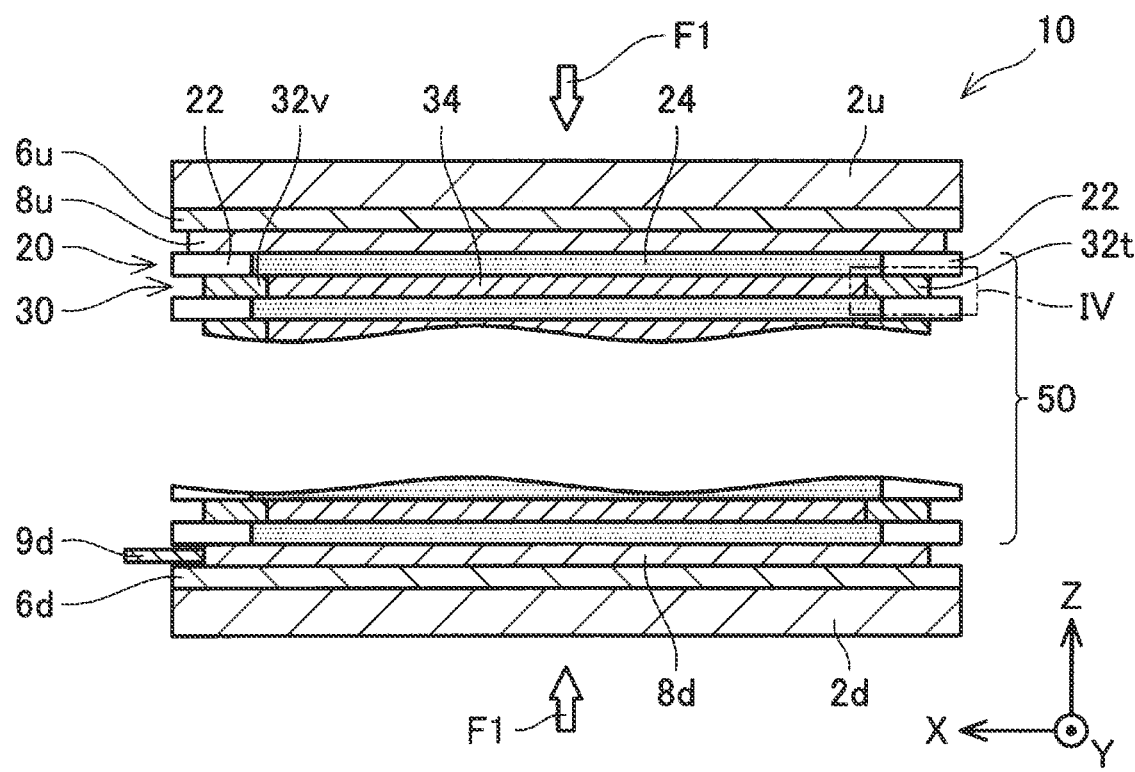
FIG. 3 is a cross-sectional view taken along line in FIG. 2.

Referring to FIG. 3, the internal structure of the battery unit 10 will be described. In FIG. 3, the reference signs are assigned only to the battery module 20 and cooling plate 30 located on the positive side of the battery module group 50 as viewed in the Z-axis direction (namely, on the upper side on the paper of FIG. 3), and no reference signs are assigned to other battery modules and cooling plates.

As described above, the pressing unit 2 presses the first pressing plate 2u against the second pressing plate 2d by the bolts 4 (see FIG. 1). As a result, as shown in FIG. 3, the battery module group 50 receives pressing force F1 from the pressing unit 2, in the first direction (i.e., in the vertical direction on the paper of FIG. 3). As a result, each cooling plate 30 is constantly pressed against the corresponding battery modules 20. Thus, electricity generated in the battery module 20 is transmitted, via the main plate 34 of the cooling plate 30 superposed on the battery module 20, to the battery module 20 superposed on the cooling plate 30. Thus, the battery modules 20 are connected in series, via the main plates 34 of the cooling plates 30 superposed on the battery modules 20.

Manufacturing errors may arise in the thicknesses of the respective battery modules 20 and respective cooling plates 30 of the battery module group 50. Thus, variations may arise in the intensity of force with which the pressing force F1 presses each cooling plate 30 against each battery module 20. For example, when an error arises in such a direction as to increase the thickness of each battery module 20 or each cooling plate 30, the intensity of the force that presses each cooling plate 30 against each battery module 20 is increased. On the other hand, when an error arises in such a direction as to reduce the thickness of each battery module 20 or each cooling plate 30, the intensity of the force that presses each cooling plate 30 against each battery module 20 is reduced. Thus, it is difficult to make the force with which the battery module group 50 is pressed in the first direction constant, and therefore, larger force than that intended may be generated in portions where the cooling plates 30 are in abutting contact with the battery modules 20.

Figure 4:
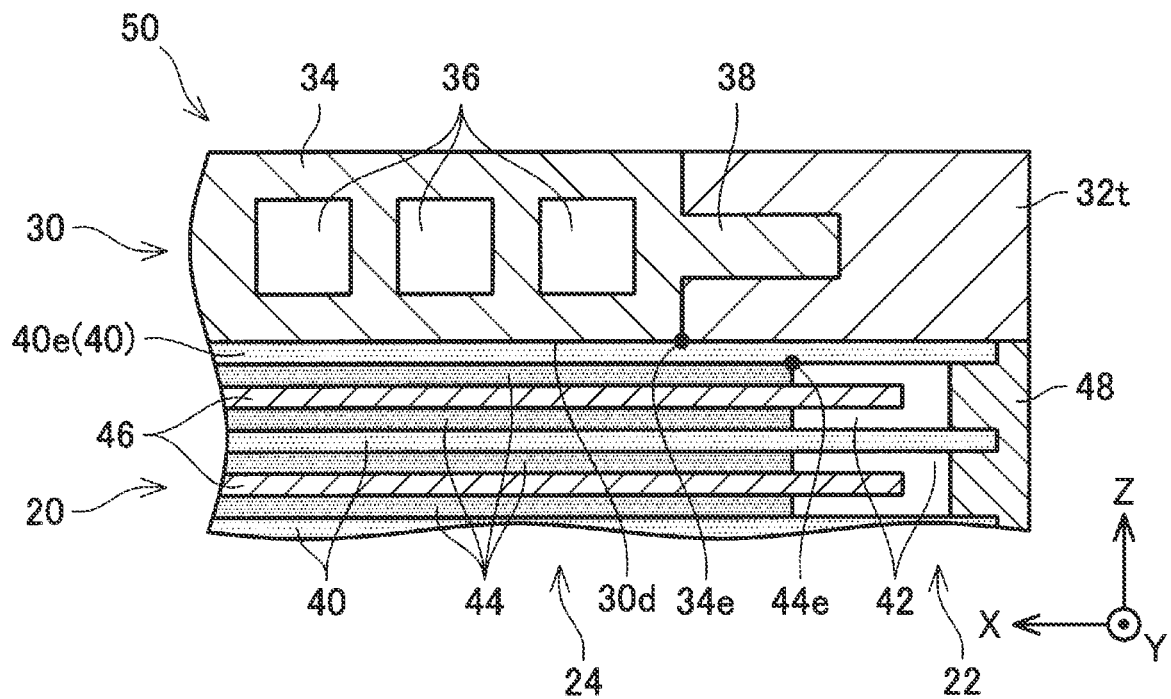
FIG. 4 is an enlarged view of a range surrounded by a broken line IV in FIG. 3.

Referring to FIG. 4, a portion where the cooling plate 30 is in abutting contact with the battery module 20 will be described in detail. While the structure around the outer edge of the cooling plate 30 on the negative side in the X-axis direction (namely, on the side to which the first sensor holder 32t is attached) will be described with reference to FIG. 4, a similar structure is also provided on the positive side in the X-axis direction (namely, on the side to which the second sensor holder 32v is attached). Also, all of the portions where the respective cooling plates 30 are in abutting contact with the corresponding battery modules 20 have substantially the same structure.

Initially, the structure of the cooling plate 30 will be described in detail. A plurality of channels 36 is formed inside the main plate 34 of the cooling plate 30. A protruding portion 38 that extends toward the first sensor holder 32t is formed on an outer edge of the main plate 34 on the negative side in the X-axis direction (namely, on the right-hand side on the paper of FIG. 4). The first sensor holder 32t is provided with a groove in which the protruding portion 38 of the main plate 34 is fitted. With the protruding portion 38 of the main plate 34 thus press-fitted in the groove of the first sensor holder 32t, the first sensor holder 32t is fixed to the main plate 34 along its outer periphery.

As a result, a plate-side boundary 34e between the main plate 34 and the first sensor holder 32t is formed, on an abutting surface 30d of the cooling plate 30 that is in abutting contact with the battery module 20. As described above, the first sensor holder 32t is attached, as a separate component, to the main plate 34. Therefore, due to a manufacturing error, for example, a gap may be generated between the first sensor holder 32t and the main plate 34, on the plate-side boundary 34e. Also, the first sensor holder 32t made of resin is more likely to expand at high temperatures, as compared with the main plate 34 made of metal. Thus, space may be provided between the first sensor holder 32t and the main plate 34, so as to prevent the first sensor holder 32t that has expanded, from interfering with the main plate 34.

For the above reasons, a step that extends in the first direction is likely to appear on the plate-side boundary 34e. As described above, the abutting surface 30d of the cooling plate 30 is pressed against the battery module 20 in the first direction, under the pressing force F1 (see FIG. 3) of the pressing unit 2 (see FIG. 1). Therefore, if a step appears on the plate-side boundary 34e, a corner of the step is pressed against a surface of the battery module 20.

Next, the structure of the battery module 20 will be described in detail. The battery module 20 is constructed such that a plurality of electrode sheets 40 is laminated in the first direction, and ends of the electrode sheets 40 as viewed in the X-axis direction (namely, the lateral direction on the paper of FIG. 4) are sealed by a seal material 48. Each electrode sheet 40 is provided with an active substance 44 and a separator 46. The electrode sheet 40 is a metallic foil formed typically of aluminum. The active substance 44 and the separator 46 are sandwiched between the electrode sheets 40. The active substance 44 includes a positive-electrode active substance, and a negative-electrode active substance. The positive-electrode active substance is a lithium-transition metal composite oxide, and a negative-electrode active substance is a carbon material. The separator 46 prevents the positive-electrode active substance and the negative-electrode active substance of the active substance 44 from contacting with each other.

The active substance 44 is placed on middle portions of surfaces of the electrode sheet 40. On the other hand, in a peripheral portion of the electrode sheet 40, no active substance 44 is placed on both surfaces of the electrode sheet 40. An electrolyte 42 is housed in the peripheral portion of the electrode sheet 40. The electrolyte 42 is typically an organic solvent. The battery module 20 conducts charge and discharge, through movement of lithium ions between the positive-electrode active substance and the negative-electrode active substance of the active substance 44, via the electrolyte 42.

There is no active substance 44 in the uncoated portion 22 where the electrolyte 42 exists. As described above, the active substance 44 is formed of a material including metal, etc., and is thus less likely to deform as compared with the electrolyte 42. Therefore, the uncoated portion 22 is more likely to deform in the first direction, as compared with the coated portion 24 in which the active substance 44 exists. Further, the outer edge of the active substance 44 on each electrode sheet 40 is located so as to be aligned with those of the other electrode sheets 40 when viewed along the first direction. As a result, an electrode-side boundary 44e as a boundary between the coated portion 24 and the uncoated portion 22 is likely to be a point of origin of deformation of the electrode sheet 40. For example, when the battery module 20 is pressed under the pressure of the pressing unit 2, the uncoated portion 22 deforms in the first direction (namely, the downward direction on the paper of FIG. 4), originally from the electrode-side boundary 44e. As a result, an end portion of an outer electrode sheet 40e that is in abutting contact with the abutting surface 30d of the cooling plate 30 bends in the first direction (namely, in the downward direction on the paper of FIG. 4), originally from the electrode-side boundary 44e. Thus, on the electrode-side boundary 44e, the outer electrode sheet 40e is likely to be damaged.

In the battery unit 10 (see FIG. 1), a given section shown in FIG. 4 extends in the Y-axis direction (namely, in the front-back direction on the paper of FIG. 4). Namely, the electrode-side boundary 44e and the plate-side boundary 34e extend in parallel in the Y-axis direction. Furthermore, the electrode-side boundary 44e and the plate-side boundary 34e are spaced from each other in the X-axis direction (namely, in the lateral direction on the paper of FIG. 4). Namely, in a section where the electrode-side boundary 44e and the plate-side boundary 34e extend in parallel, the electrode-side boundary 44e and the plate-side boundary 34e do not overlap with each other when viewed along the first direction. In the other words, the electrode-side boundary 44e and the plate-side boundary 34e are out of alignment, in a section where the electrode-side boundary 44e and the plate-side boundary 34e extend in parallel, when viewed along the first direction. Thus, a section where the electrode-side boundary 44e on which the outer electrode sheet 40e is likely to be damaged, and the plate-side boundary 34e on which a step is likely to appear, are in abutting contact with each other, is reduced. Thus, a step produced on the plate-side boundary 34e is less likely or unlikely to damage the outer electrode sheet 40e on the electrode-side boundary 44e. Namely, the battery unit 10 makes it possible to reduce damage to the outer electrode sheet 40e.

Further, as shown in FIG. 4, the plate-side boundary 34e is located on the inner side (namely, on the left-hand side on the paper of FIG. 4) than the electrode-side boundary 44e. In other words, the plate-side boundary 34e is located on the coated portion 24, when viewed along the first direction. As a result, the position of the temperature sensor T1 (see FIG. 2) held by the first sensor holder is close to the coated portion 24. With this arrangement, the temperature sensor T1 can detect the temperature of the electrode sheet 40 (namely, the coated portion 24) with improved accuracy.

As described above, since the first sensor holder 32t is made of resin, it is more likely to deform under the pressing force F1 of the pressing unit 2, as compared with the main plate 34 made of metal. As the first sensor holder 32t deforms, the uncoated portion 22 that is in abutting contact with the first sensor holder 32t also deforms. Namely, when the main plate 34 is made of metal, and the first sensor holder 32t is made of resin, the uncoated portion 22 is more likely to deform, as compared with the case where the first sensor holder 32t made of metal is employed. Thus, the technology disclosed in the specification is particularly useful, when the first sensor holder 32t made of resin is employed.

While one embodiment has been described in detail, the embodiment is merely exemplary, and is not intended to limit the appended claims. The technologies described in the claims include various modifications or alterations of the illustrated embodiment. Some modified examples of the above embodiment will be listed below.

First Modified Example

In the above embodiment, the plate-side boundary 34e is located on the coated portion 24, when viewed along the first direction. In a first modified example, the plate-side boundary 34e may be located on the uncoated portion 22 instead.

Second Modified Example

In the above embodiment, the cooling plate 30 includes the first sensor holder 32t and the second sensor holder 32v. In a second modified example, the cooling plate 30 may include only the first sensor holder 32t. In this case, the first sensor holder 32t may hold both the temperature sensor T1 and the voltage sensor V1.

Third Modified Example

In the above embodiment, the cooling plate 30 includes both the temperature sensor T1 and the voltage sensor V1. In a third modified example, the cooling plate 30 may include only the voltage sensor V1, for example. Namely, the cooling plate 30 may not include the temperature sensor T1.

Fourth Modified Example

Each of the sensor holders 32t, 32v may be made of metal.

Fifth Modified Example

The battery module group 50 may not have a plurality of battery modules 20 stacked in the first direction. Namely, in a fifth modified example, the battery unit 10 may include only one battery module 20.

Sixth Modified Example

In the above embodiment, each of the cooling plates 30 includes the temperature sensor T1 held by the first sensor holder 32t, and the voltage sensor V1 held by the second sensor holder 32v. In a sixth modified example, at least one of the cooling plates 30 may have a spacer having the same shape as the first sensor holder 32t. In this case, the spacer, which replaces the first sensor holder 32t, for example, is attached to an outer edge of the main plate 34. The spacer does not hold the temperature sensor T1. With the spacer having the same shape as the first sensor holder 32t thus attached to the outer edge of the main plate 34, the number of the temperature sensors T1 can be reduced. Also, with the spacer having the same shape as the first sensor holder 32t thus attached to one or more cooling plates 30 having no temperature sensor T1, all of the cooling plates 30 are equally sized. As a result, the pressing force F1 of the pressing unit 2 is evenly distributed to the cooling plates 30.

Seventh Modified Example

In the above embodiment, the battery module group 50 is pressed in the first direction, by the pressing unit 2. In a seventh embodiment, the battery module group 50 may be sealed with resin, in place of the pressing unit 2.

While some specific examples of the disclosure have been described in detail, these are merely exemplary, and are not intended to limit the appended claims. The technologies described in the claims include those obtained by modifying or changing the illustrated specific examples in various ways. The technical elements described in the specification or the drawings exhibit technical usefulness when they are used alone or in various combinations, and are not limited to combinations described in the claims as filed. Also, the technology illustrated in the specification or the drawings may accomplish two or more objects at the same time, and have technical usefulness simply by accomplishing one of the objects.

What is claimed is:

1. A battery unit, comprising:
   a battery module having a plurality of electrode sheets stacked along a first direction; and
   a cooling plate that is superposed on a surface of the battery module,
   wherein each of the electrode sheets has a coated portion having at least one surface on which an active substance exists, and an uncoated portion that is located adjacent to the coated portion, and has both surfaces on which the active substance does not exist,
   wherein the cooling plate has a main plate that is opposed to the coated portion, and is configured to cool the battery module, and at least one sensor holder that is attached to an outer edge of the main plate, the at least one sensor holder is configured to hold a sensor that detects information concerning the battery module, and the at least one sensor holder includes a groove, and the main plate includes a protruding portion disposed in the groove of the at least one sensor holder,
   wherein an abutting surface of the cooling plate that is in abutting contact with the battery module includes a boundary between the main plate and the sensor holder, and
   wherein a boundary between the coated portion and the uncoated portion of the each electrode sheet and the boundary between the main plate and the sensor holder on the abutting surface of the cooling plate do not overlap with each other, when viewed along the first direction, in a section in which the boundary between the coated portion and the uncoated portion and the boundary between the main plate and the sensor holder extend in parallel with each other.

2. The battery unit according to claim 1, wherein at least a part of the boundary between the main plate and the sensor holder on the abutting surface is located on the coated portion of the each electrode sheet, when viewed along the first direction.

3. The battery unit according to claim 1, wherein the sensor holder has a first sensor holder attached to a first outer edge of the main plate, and a second sensor holder attached to a second outer edge of the main plate located opposite to the first outer edge.

4. The battery unit according to claim 3, wherein:
   the first sensor holder holds a first sensor that detects a first type of information concerning the battery module; and
   the second sensor holder holds a second sensor that detects a second type of information concerning the battery module, the second type of information being different from the first type of information.

5. The battery unit according to claim 4, wherein the first sensor is a temperature sensor that detects a temperature of the battery module.

6. The battery unit according to claim 4, wherein the second sensor is a voltage sensor that detects a voltage of the battery module.

7. The battery unit according to claim 1, wherein:
   the main plate is made of metal; and
   the sensor holder is made of resin.

8. The battery unit according to claim 1, comprising a plurality of the battery modules and a plurality of the cooling plates,
   wherein the battery modules and the cooling plates are alternately stacked along the first direction.

9. The battery unit according to claim 8, wherein at least one of the cooling plates has the main plate, and a spacer that has the same shape as the sensor holder and is attached to an outer edge of the main plate.

10. The battery unit according to claim 1, further comprising a pressing unit configured to press the battery module and the cooling plate in the first direction.

11. The battery unit according to claim 1, further comprising a temperature sensor fixed to the sensor holder.

12. The battery unit according to claim 11, wherein the temperature sensor is exposed to a surface of the sensor holder.

13. The battery unit according to claim 11, wherein the temperature sensor is embedded in a recess formed in the surface of the sensor holder.

14. The battery unit according to claim 11, wherein the temperature sensor does not protrude from the surface of the sensor holder.

\* \* \* \* \*